(12) United States Patent
Muthu

(10) Patent No.: US 9,722,879 B1
(45) Date of Patent: Aug. 1, 2017

(54) METHOD AND APPARATUS OF AN INTUITIVE WEB BASED COMMAND LINE INTERFACE

(71) Applicant: Springpath, Inc., Sunnyvale, CA (US)

(72) Inventor: Suresh Muthu, San Jose, CA (US)

(73) Assignee: Springpath, Inc., Sunnyvale, CA (US)

( * ) Notice: Subject to any disclaimer, the term of this patent is extended or adjusted under 35 U.S.C. 154(b) by 306 days.

(21) Appl. No.: 14/542,439

(22) Filed: Nov. 14, 2014

(51) Int. Cl.
| | |
|---|---|
| *G06F 3/048* | (2013.01) |
| *H04L 12/24* | (2006.01) |
| *G06F 3/0484* | (2013.01) |
| *H04L 29/08* | (2006.01) |
| *G06F 3/0482* | (2013.01) |

(52) U.S. Cl.
CPC .......... *H04L 41/22* (2013.01); *G06F 3/0482* (2013.01); *G06F 3/04842* (2013.01); *H04L 67/1097* (2013.01)

(58) Field of Classification Search
CPC . H04L 41/0253; H04L 41/0806; H04L 41/22; H04L 67/10; H04L 67/1097; G06F 3/0481–3/04842; G06F 3/0604–3/0689; G06F 3/017; G06F 11/1464
See application file for complete search history.

(56) References Cited

U.S. PATENT DOCUMENTS

| | | | | |
|---|---|---|---|---|
| 2003/0126195 A1* | 7/2003 | Reynolds | .................. | G06F 1/14 709/203 |
| 2003/0163570 A1* | 8/2003 | Hendley | ............... | G06F 9/4443 709/227 |
| 2009/0172541 A1* | 7/2009 | Acedo | ................. | G06F 9/45512 715/708 |
| 2011/0191405 A1* | 8/2011 | Boruhovski | ............ | G06F 15/16 709/203 |
| 2013/0263043 A1* | 10/2013 | Sarbin | .................. | G06F 3/0488 715/784 |
| 2015/0254121 A1* | 9/2015 | Anderson | ........... | G06F 11/0706 714/37 |

* cited by examiner

*Primary Examiner* — Claudia Dragoescu
(74) *Attorney, Agent, or Firm* — Blakely, Sokoloff, Taylor & Zafman LLP

(57) ABSTRACT

A device that generates suggested command completions for a distributed storage system is described. In an exemplary embodiment, the device receives a command token from a management client, wherein the command token is a partial command for the distributed storage system. In addition, the device retrieves a plurality of complete commands for the distributed storage system; wherein one of the plurality of complete commands includes a parameter based on a current configuration of the distributed storage system. The device further determines a subset of the plurality of complete commands that match the command token. The device sends the subset of the plurality of complete commands to the management client.

17 Claims, 11 Drawing Sheets

METHOD AND APPARATUS OF AN INTUITIVE WEB BASED COMMAND LINE INTERFACE

FIELD OF INVENTION

This invention relates generally to a command line interface for a distributed storage system and more particularly to generating command suggestions in response a partially entered command token for a web based command line interface of the distributed storage system.

BACKGROUND OF THE INVENTION

A command line interface (CLI) is a way of interacting with a computer program where a user issues commands to the program in the form of successive lines of text. A CLI is used for modern network operating of network devices to allow a user to interact with that operating system. This is used to perform day-to-day management of the network device once the user logins into the network operating system. Traditional CLI requires the user to use special tools like secure shell (SSH) or telnet to login and needs to run from desktop machines.

However, a user may not know all the commands available and will need to explore the CLI by entering partial commands. Another way to understanding the semantics of a CLI is use an online help provided by the CLI (e.g., --help, -h or /? for each and every command). Online CLI help systems tend to be difficult to use, because the CLI help system will describe how to use a CLI command, but not in the context of the configured network system. In addition, the availability of a CLI help system may not address the problem completely. CLI commands further require extensive documentation to specify the list of all commands supported by the system. In addition, a CLI requires special tools to access and making it not accessible from modern mobile devices like tablets and phones. To connect to CLI the user has to buy expensive tools or applications that support secure SSH or telnet connection.

SUMMARY OF THE DESCRIPTION

A device that generates suggested command completions for a distributed storage system is described. In an exemplary embodiment, the device receives a command token from a management client, wherein the command token is a partial command for the distributed storage system. In addition, the device retrieves a plurality of complete commands for the distributed storage system; wherein one of the plurality of complete commands includes a parameter based on a current configuration of the distributed storage system. The device further determines a subset of the plurality of complete commands that match the command token. The device sends the subset of the plurality of complete commands to the management client.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A device that generates suggested command completions for a distributed storage system is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

Figure 4:
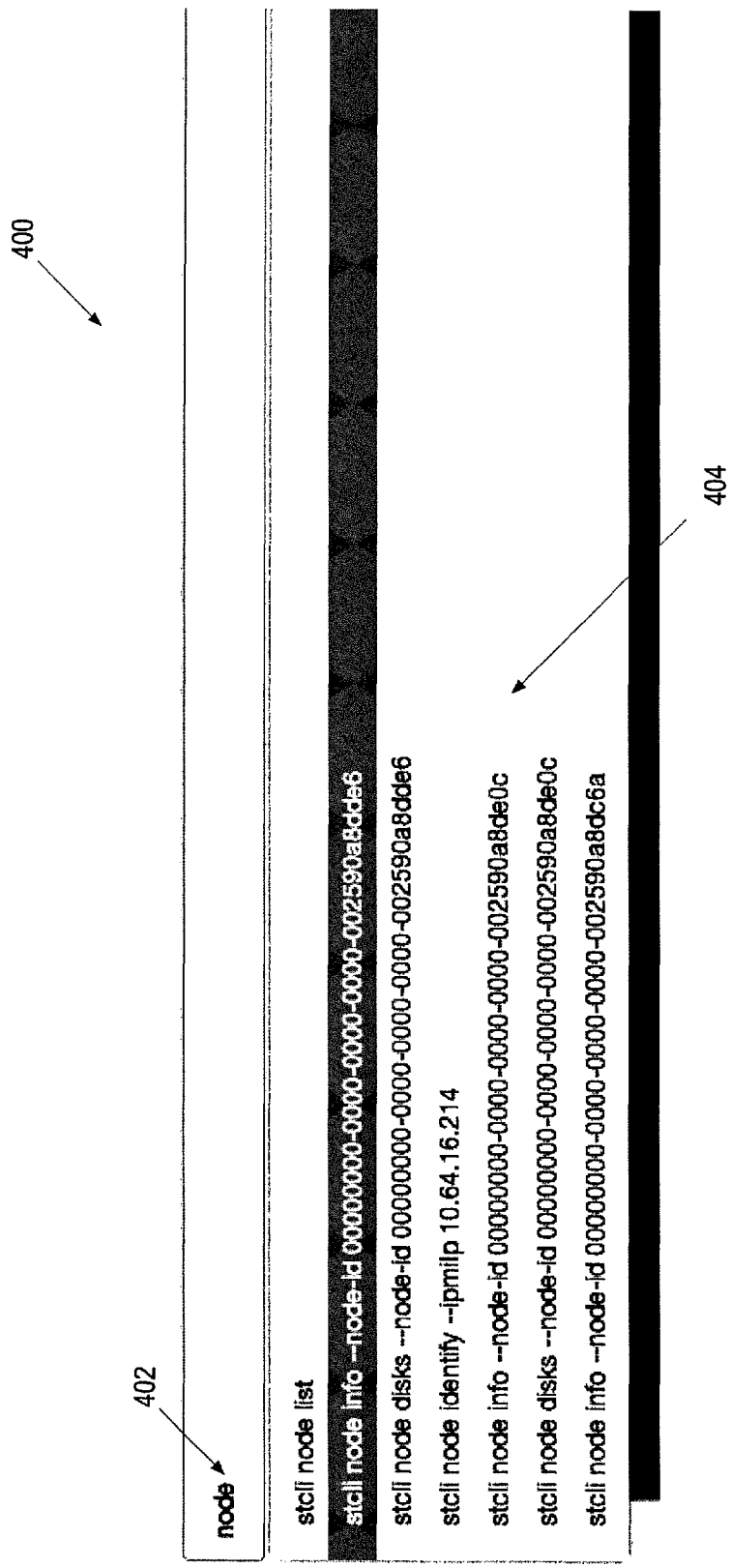
FIG. 4 is an illustration of a web user interface with a list of command suggestions given in response a command token entered by a user.

A device that generates suggested command completions for a distributed storage system is described. In one embodiment, the device provides a secure, web based interface for CLI that can be accessed from a management client that supports web browser (e.g., personal computer, laptop, server, mobile device (e.g., smartphone, laptop, personal digital assistant, music playing device, gaming device, etc.), set-top box, Blu-ray player, and/or any device capable of capturing a command token and/or displaying one or more command suggestions). The device additionally provides suggestions to the user with possible commands with complete syntax as the user starts to type one or more characters of text into a command bar of the CLI web based interface. In addition, the device provides command suggestions with possible values as parameters to the command because the device builds a command token as the characters are entered and displays the suggested commands. In one embodiment, the parameters can be a name, an Internet Protocol (IP) address, an object identifier, and/or a sub-action. For example and in one embodiment, consider the command line interface "stcli node info --node-id 00000000-0000-0000-0000-002590a8dde6" where the long machine understandable code after "--node-id" is the parameter to this command. In order to get the list of parameters for "stcli node info --node-id," the user will execute another command (e.g., "stcli node list") and copy and paste the part of the output into the next command. With the proposed solution described below, when the user starts to type "node," the system provides suggestions for all the nodes in the system as shown in FIG. 4 described below.

Figure 5:
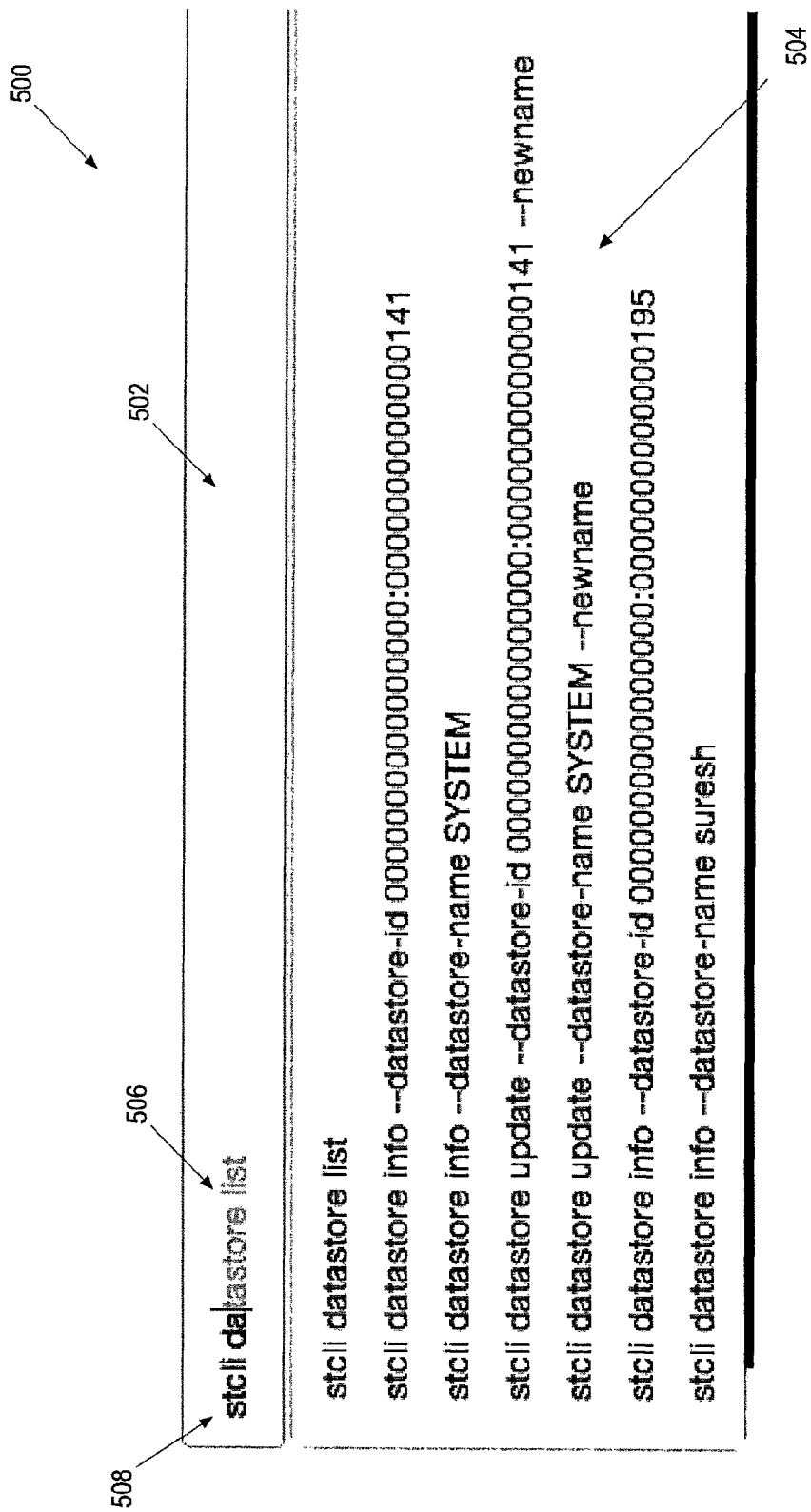
FIG. 5 is an illustration of a web user interface with a list of command suggestions given in response a command token entered by a user, where the first suggestion is given as a watermark.
Figure 8:
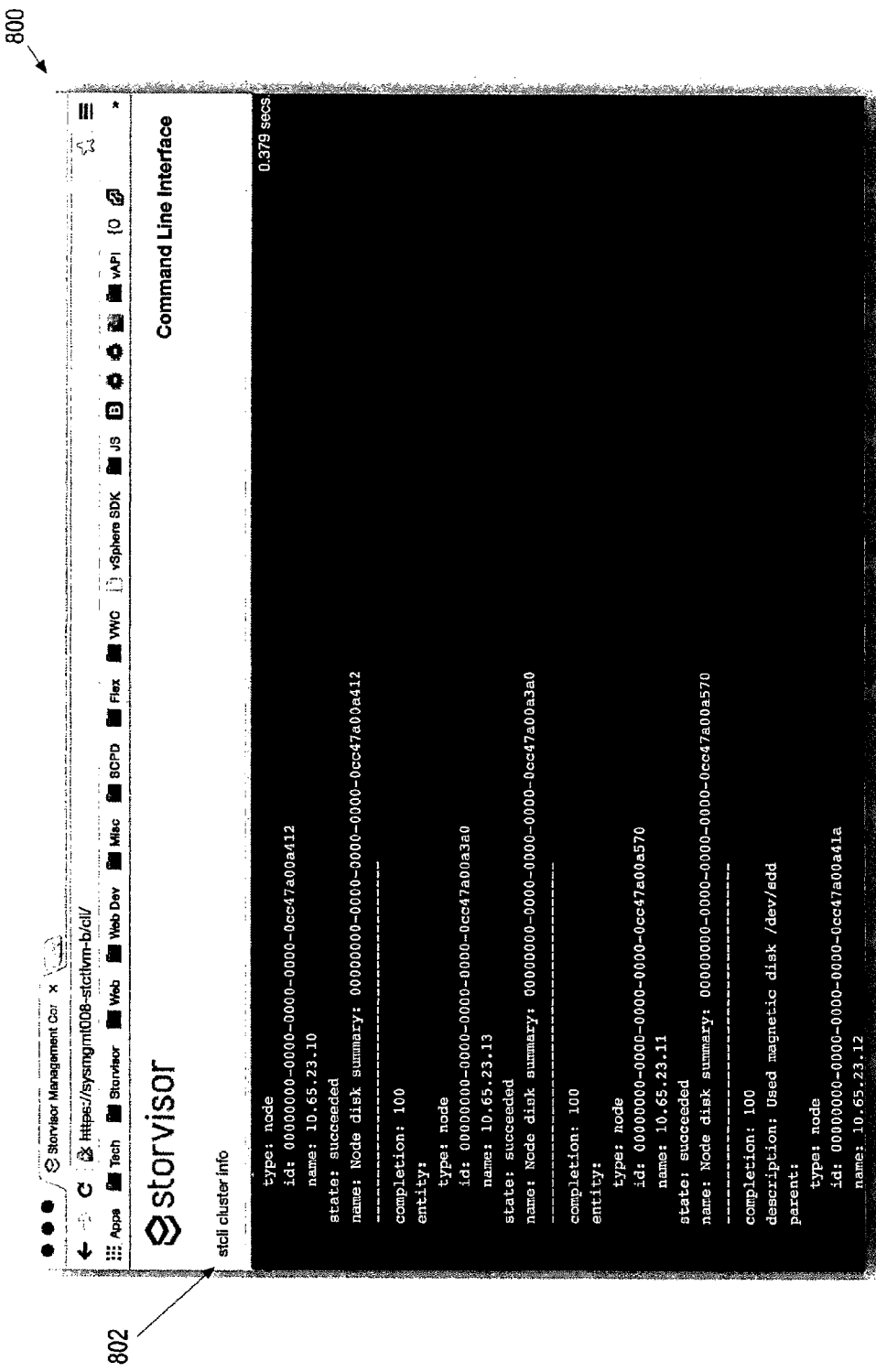
FIG. 8 is an illustration of an output for an entered command line interface command.

In one embodiment, the device further provides autocompletion with 'tab' key or signal. In this embodiment, the user interface provides hints/completion when the user selects tab as shown in FIG. 5 below. In one embodiment, the proposed intuitive web based user interface for CLI can be made as a part of a network device or system management systems to service novice users as well as advanced users. The suggestions provided in search field can be categorized into multiple categories and can be catered to various parts of the management application. When the user selects a command from the list of commands the system executes the command and provides the results as shown in FIG. 8 described below. In one embodiment, the device can execute partial commands and provide possible values for advanced users.

Figure 1:
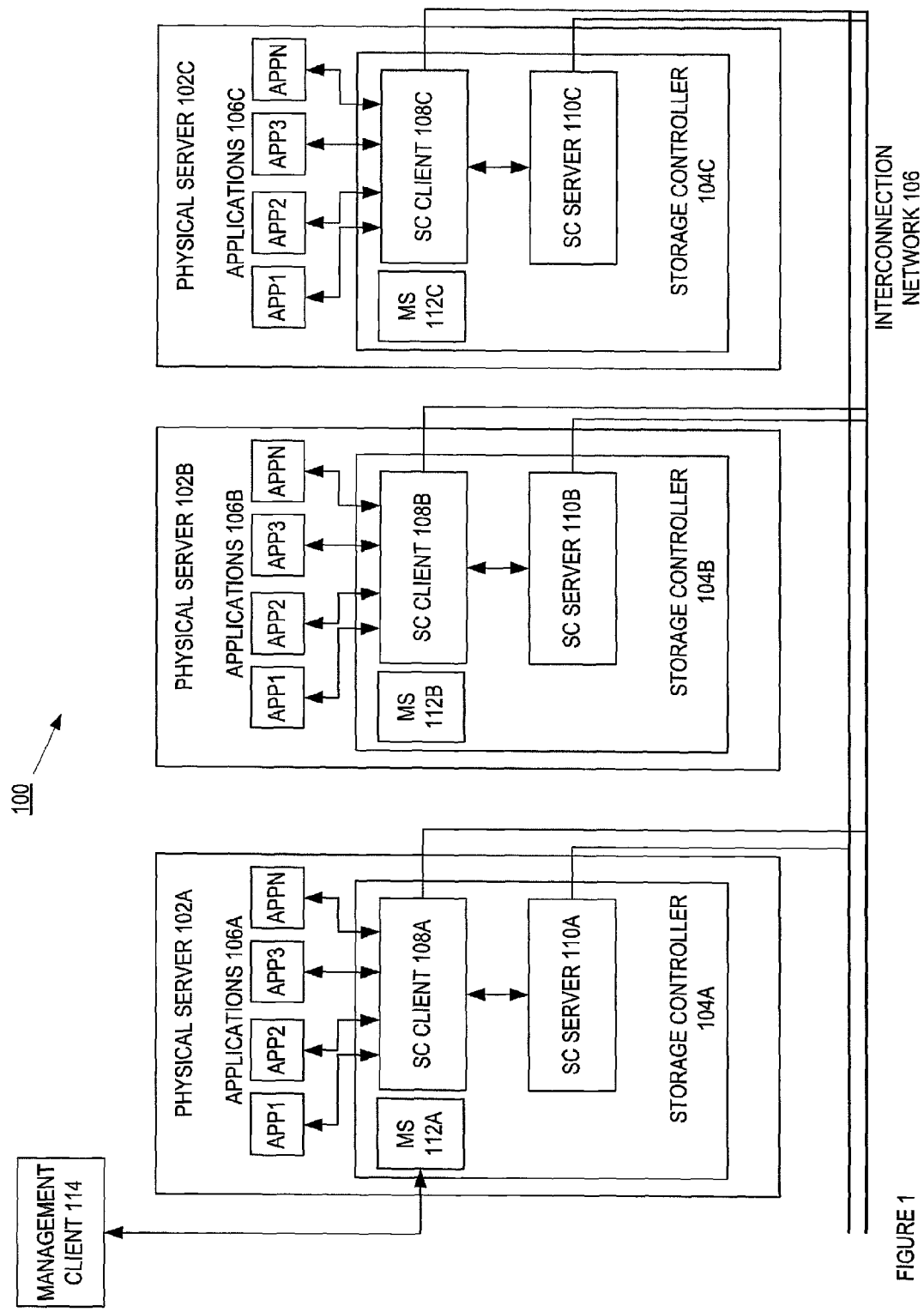
FIG. 1 is an illustration of one embodiment of a high-level view of StorFS system.

FIG. 1 is an illustration of one embodiment of a high-level view of StorFS system 100. In FIG. 1, the StorFS system 100 includes storage nodes 102A-C coupled by an interconnection network 116. While in one embodiment, three storage nodes 102A-C are illustrated as part of the StorFS system 100, in alternate embodiments, there can be more or less storage nodes. For example and in one embodiment, the StorFS system 100 can include up to several hundred storage nodes. In one embodiment, each storage node 102A-C includes a storage controller (SC) client (also called dispatcher) 108A-C, a storage controller (SC) server 110A-C, or both. The SC servers 110A-C manage their underlying storage (e.g., Hard disk drive (HDD), Solid state drives (SSD), PCIe flash, etc.) and collectively provide reliable and unified storage functionality to the SC clients. The SC client 108A-C processes input/output (I/O) requests from the applications that are local to its physical storage node and routes them to the appropriate SC servers for processing. For example and in one embodiment, SC client 108A can send an I/O request locally to SC Server 110A and/or remotely to SC Servers 110B or 110C. The system is capable of exposing many different interfaces to the application like file (e.g. NFS, CIFS), object, key-value, or another type of interface. In one embodiment, the storage node 102A-C can be server, blade server, personal computer, or any other type of device capable of storing data. In one embodiment, the management server 112A-C is an agent that is used to communicate system management data and commands regarding the corresponding storage node 102A-C with the management client 114.

In one embodiment, the design of the StorFS system 100 distributes both the data and the metadata, and this system 100 does not require storing a complete global map for locating individual data blocks in our system. The responsibility of managing metadata is offloaded to each individual storage nodes 102A-C. In one embodiment, a cluster manager (CRM) resides on each SC Server 110 maintains some global metadata, which is small compared to the local metadata. In one embodiment, each logical file (or entity) is partitioned into equal sized "stripe units". The location of a stripe unit is determined based on a mathematical placement function Equation (1):

$$\text{Virutal\_Node\#} = \text{Hash}(\text{Entity}_{Id}, \text{Stripe\_Unit\#})\%\text{Total\_Vitual\_Nodes} \quad (1)$$

$$\text{Stripe\_Unit\#} = \frac{\text{offset}}{\text{Stripe\_Unit\_Size}}\%\text{Stripe\_Unit\_Per\_Stripe}$$

The $\text{Entity}_{Id}$ is an identification of a storage entity that is to be operated upon, the Total_Virtual_Nodes is the total number of virtual nodes in the StorFS system 100, the offset is an offset into the storage entity, and the Stripe_Unit_Size is the size of each stripe unit in the StorFS system 100. The value Stripe_Unit_Per_Stripe is described further below. In one embodiment, the storage entity is data that is stored in the StorFS system 100. For example and in one embodiment, the storage entity could be a file, an object, key-value pair, etc. In this example, the $\text{Entity}_{Id}$ can be an iNode value, a file descriptor, an object identifier, key/value identifier, etc. In one embodiment, an input to a storage operation is the $\text{Entity}_{Id}$ and the offset (e.g., a write, read, query, create, delete, etc., operations). In this embodiment, the $\text{Entity}_{Id}$ is a globally unique identification.

In one embodiment, the StorFS 100 system receives the $\text{Entity}_{Id}$ and offset as input for each requested storage operation from an application 106A-C. In this embodiment, the StorFS system 100 uses the offset to compute a stripe unit number, Stripe_Unit#, based on the stripe unit size, Stripe_Unit_Size, and the number of virtual nodes that the entity can be spread across, Stripe_Unit_Per_Stripe. Using the stripe unit number and the entity identifier ($\text{Entity}_{Id}$), the StorFS system 100 computes the virtual node identifier. As described below, the StorFS system 100 uses a hash function to compute the virtual node identifier. With the virtual node identifier, the StorFS 100 can identify which physical node the storage entity is associated with and can route the request to the corresponding SC server 110A-C.

In one embodiment, each vNode is a collection of either one or more data or metadata objects. In one embodiment, the StorFS system 100 does not store data and metadata in the same virtual node. This is because data and metadata may have different access patterns and quality of service (QoS) requirements. In one embodiment, a vNode does not span across two devices (e.g., a HDD). A single storage disk of a storage node 102A-C may contain multiple vNodes. In one embodiment, the placement function uses that a deterministic hashing function and that has good uniformity over the total number of virtual nodes. A hashing function as known in the art can be used (e.g., Jenkins hash, murmur hash, etc.). In one embodiment, the "Stripe_Unit_Per_Stripe" attribute determines the number of total virtual nodes that an entity can be spread across. This enables distributing and parallelizing the workload across multiple storage nodes (e.g., multiple SC servers 110A-C). In one embodiment, the StorFS system 100 uses a two-level indexing scheme that maps the logical address (e.g., offset within a file or an object) to a virtual block address (VBA) and from the VBAs to physical block address (PBA). In one embodiment, the VBAs are prefixed by the ID of the vNode in which they are stored. This vNode identifier (ID) is used by the SC client and other StorFS system 100 components to route the I/O to the correct cluster node. The physical location on the disk is determined based on the second index, which is local to a physical node. In one embodiment, a VBA is unique across the StorFS cluster, where no two objects in the cluster will have the same VBA.

In one embodiment, the cluster manager (CRM) maintains a database of virtual node (vNode) to physical node (pNode) mapping. In this embodiment, each SC client and server caches the above mapping and computes the location of a particular data block using the above function in Equation (1). In this embodiment, the cluster manager need not be consulted for every I/O. Instead, the cluster manager is notified if there is any change in 'vNode' to 'pNode' mapping, which may happen due to node/disk failure, load balancing, etc. This allows the StorFS system to scale up and parallelize/distribute the workload to many different storage nodes. In addition, this provides a more deterministic routing behavior and quality of service. By distributing I/Os across different storage nodes, the workloads can take advantage of the caches in each of those nodes, thereby providing higher combined performance. Even if the application migrates (e.g., a virtual machine migrates in a virtualized environment), the routing logic can fetch the data from the appropriate storage nodes. Since the placement is done at the stripe unit granularity, access to data within a particular stripe unit goes to the same physical node. Access to two different stripe units may land in different physical nodes. The striping can be configured at different level (e.g., file, volume, etc.) Depending on the application settings, the size of a stripe unit can range from a few megabytes to a few hundred megabytes. In one embodiment, this can provide a good balance between fragmentation (for sequential file access) and load distribution.

Figure 2:
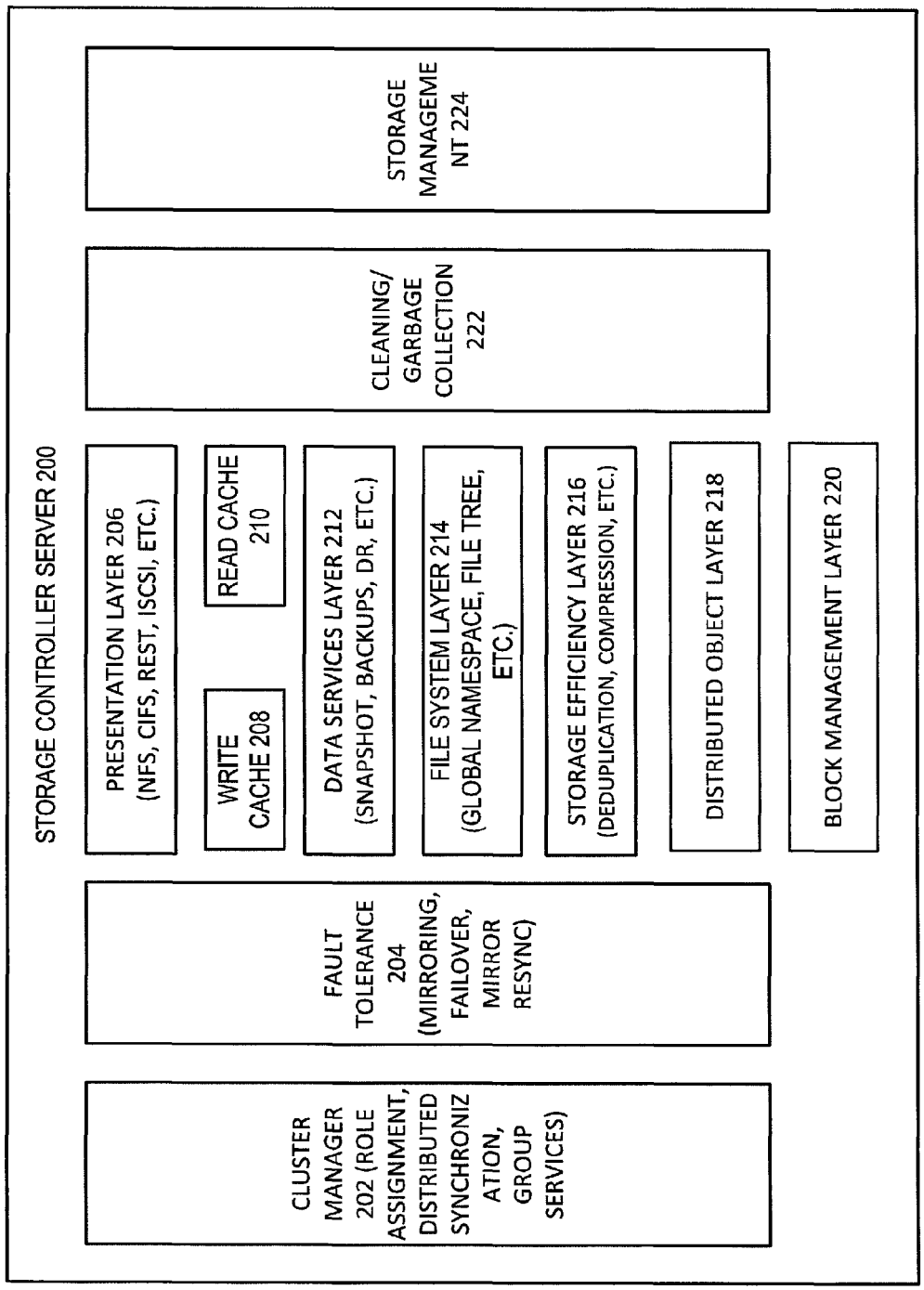
FIG. 2 is an illustration of one embodiment of a system including some of the components that comprises the storage controller server.

FIG. 2 is a block diagram of one embodiment of a storage control server 200. In one embodiment, the Block Management Layer 220 of the storage control server is responsible for formatting, allocating, and freeing storage in fixed block sizes. This layer provides access to different kinds of storage (e.g., SSD, HDD, etc.) in the system. In one embodiment, the Distributed Object Layer 218 of the storage control server uses an API of the Block Management Layer 220 to provide a global distributed object namespace that is accessible over the network. In one embodiment, the Storage Efficiency Layer 216 reduces the size of data footprint on the physical medium using techniques like compression, deduplication, etc. The reduction is achieved without deteriorating the performance or the reliability of the data storage. In one embodiment, the File System Layer 214 provides a logical global namespace abstraction to organize and locate data in the cluster. In one embodiment, the Data Service Layer 212 provides enterprise data services like disaster recovery, fine grained policy management, snapshots/clones, etc. In one embodiment, the Write Cache 208 and the Read Cache 210 Layers provide acceleration for write and read I/O respectively using fast storage devices. In one embodiment, the Write Cache Layer 208 includes the write log as described below. In one embodiment, the Read Cache Layer 210 includes a deduplicated object cache layer (DOCL) that is used to cache recently added and accessed objects for the StorFS system. In one embodiment, the DOCL is a multi-layer cache that is described below. In one embodiment, the Presentation Layer 206 provides an interface to access the StorFS storage using well-known standard protocols like NFS, CIFS, REST, iSCSI, etc. In one embodiment, the Cluster Manager (CRM) Layer 202 is responsible for the coordination across distributed StorFS components, delegating responsibilities and maintaining a consistent global state of the system. In one embodiment, the Fault Tolerance Layer 204 is responsible for resiliency and making sure that the data is available and consistent even after the failure of a software or hardware component (disk, server, network, etc.). In one embodiment, the Garbage Collection Layer 222 is responsible for reclaiming dead space that result due to entities getting deleted or updated. This layer efficiently determines the storage blocks that are not used (or referenced) and makes them available for new data to be written. In one embodiment, the Storage Management Layer 224 provides a framework to configure, monitor, analyze and report on the operation of the overall StorFS cluster storage system as well as individual logical and physical entities in the cluster. In one embodiment, each of the layers mentioned above are fully distributed and each layer does not rely on any centralized components for their operations.

Figure 3:
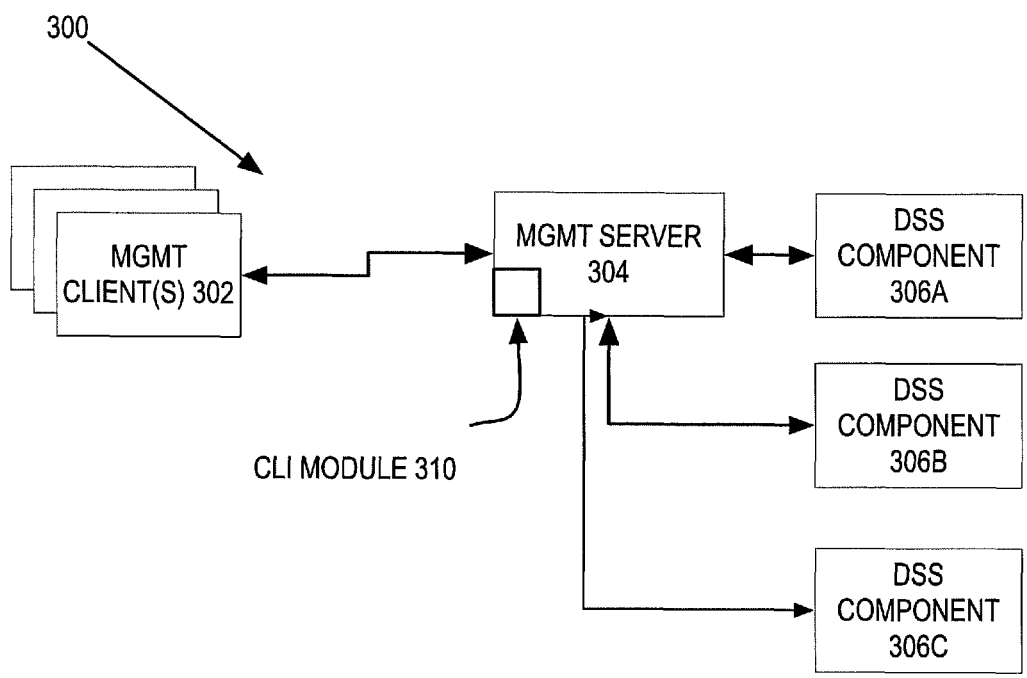
FIG. 3 is a block diagram of one embodiment of a command line management interface for the StorFS system.

FIG. 3 is a block diagram of one embodiment of a system 300 for a command line management interface for the StorFS system. In FIG. 3, system 300 includes a management client 302, a management server 304, and multiple distributed storage system components 306A-C. In one embodiment, the management client 302 is a device that is running a distributed storage system user interface, which allows a user to enter commands regarding the StorFS system. For example and in one embodiment, the commands can be used to determine the status of one or all of the components of the StorFS system, configure some or all of the StorFS components, add new component(s), delete one or more of the current components, edit one or more of the current components, and/or list the current components. In one embodiment, the management client 302 is a device that is capable of communicating with the management server 304. In one embodiment, the management client 302 can be a can be personal computer, laptop, server, mobile device (e.g., smartphone, laptop, personal digital assistant, music playing device, gaming device, etc.), set-top box, Blu-ray player, and/or any device capable requesting and/or displaying a query. In one embodiment, the device can be a physical or virtual device. In one embodiment, there can be more than one management clients 302 that are the same or different devices accessing one or more management servers 304.

In one embodiment, the management server 304 is a device that controls the management of the StorFS system. In one embodiment, the management server 304 an agent that is used to communicate system management data and commands regarding the corresponding storage node, such the management server 112A-C as described in FIG. 1 above. In one embodiment, one of the management servers 112A-C is elected as a leader and has the information about the nodes in the cluster. This stored information is distributed when the leader node goes down and a new leader gets elected.

In one embodiment, the management of the StorFS system is performed through a command line interface. In this embodiment, the command line interface is a text-based interface in which text-based line commands are received by the management client 302 and sent to the management server 304. In one embodiment, each of the text-based line commands includes a command that is used by the management server to perform an action. For example and in one embodiment, the action can be an action regarding a node, datastore, or cluster. In a further embodiment, a command can have a subcommand, and further can include an option that is used to input parameter values into the command. For example and in one embodiment, the command stcli node info --node-id 00000000-0000-0000-0000-002590a8dde6 includes the actions "stcli node," the subcommand "info," an option "--node-id," and "00000000-0000-0000-0000-002590a8dde6" is a parameter that is an option value for the "--node-id" option.

One problem with a command line interface command is that a user may not be able to remember the possible command line interface commands or remember the possible parameters that are used for each command option. In one embodiment, the management server 304 can give one or more command suggestions that can be used by a user to input a command line interface command. In one embodiment, each of the command suggestions is a complete command that includes the command action, along with the corresponding sub-command and options. In addition, a complete command can include parameters that are pulled from a current configuration of the StorFS system. For example and in one embodiment, if a possible complete command is regarding a node information and the StorFS system is configured to have five storage nodes currently up and running, the management server 304 generate a set of five complete commands for each of the five nodes that are current configured, where each of these commands includes the node identifier retrieved from the current StorFS configuration. The management client 302 receives the set of command completions and displays this set to the user. The user can view the set of command completions and select one of the command completions. By selecting one of the command completions, the user instructs the management client to send the selected command to the management server, where the management server executes the selected command.

In one embodiment, the management client 302 uses a web user interface (UI) that allows the user to enter a command token. In one embodiment, a command token is one or more text characters that are entered by the user. In this embodiment, the command token does not need to be a complete command, but can be a string of one or more characters. For example and in one embodiment, a command token can be 'n,' 'no,' 'nod,' or 'node.' In response, the web UI presents the web UI presents the set of complete commands to the user that match the entered command token. In one embodiment, for each additional character entered by the user, the same or a new set of command suggestions is generated and displayed by the web UI. In one embodiment, the web UI waits for a minimum number of characters (e.g., three characters) or a certain character (e.g., a space) before generating and displaying the set of command suggestions.

The set of the complete commands available to a user can depend on privileges granted to a user upon the user being authenticated with the management server 304. In one embodiment, a user logs into the management 304 via the management client 302. In this embodiment, the user presents security credentials (e.g., login name and password or other security credentials) and the management server 304 authenticates the user using these credentials. Upon authentication, the management server 304 grants authorization to the user to manage the StorFS system via the management server 304. In one embodiment, the management server 304 may restrict the scope of commands and object to be operated on based on the authorization granted to the user. For example in one embodiment, a user with full management privileges would be granted access to any possible complete command and the ability to operate on any object in the StorFS system (e.g., node, cluster, node, datastores, virtual machines, resource pools, or virtual machine folders). As another example and an embodiment, a user with restricted management privileges may be allowed to view object status and data, but not be able to make changes to the configuration. Restricting a user's management privileges can help if a hacker gains access to the management user interface using the restricted user's security credentials and the hacker is limited to the changes the hacker can make to the StorFS system.

FIG. 4 is an illustration of a web UI 400 with a list of command suggestions given in response a command token entered by a user. In FIG. 4, the web UI 400 includes a command bar 402 that is used to input the command token and a suggestions output window 404 that displays a set of command suggestions that match the inputted command token. In one embodiment, the set of command suggestions is a set of complete commands as described above. For example and in one embodiment, the user inputs the command token "node" into the command bar 402. In response, the web UI presents that set of command suggestions, where each of the command suggestions is a complete command for the StorFS system. For example and in one embodiment, if the user inputs the command token "node," the web UI 400 can return with the command suggestions of "stcli node info -node-id 00000000-0000-0000-0000-002590a8dde6," "stcli node disks -node-id 00000000-0000-0000-0000-002590a8dde6," "stcli node identity -ipmilp 10.64.16.214," "stcli node info -node-id 00000000-0000-0000-0000-002590a8de0c," "stcli node disks -node-id 00000000-0000-0000-0000-002590a8de0c," and "stcli node info -node-id 00000000-0000-0000-0000-002590a8dc6a." In one embodiment, a complete command is a text string that represents an executable CLI command for the StorFS system. In this embodiment, each of the suggested commands includes the command token "node" in the text of the suggested command. While in one embodiment, the command token is part of the action of the suggested command, in alternate embodiment, the command token can be in an alternate location in the text of the suggested command (e.g., as part of the sub-command, an option name, or as a parameter in an option value). As illustrated in FIG. 4, inputting the command token "node," returns a set of command suggestions that are commands that return node information, node disk information, or whether a node location led emitting diode (LED) can be turned on or off.

While in one embodiment, FIG. 4 illustrates the matching of a command action (e.g., "node"), in another embodiments, the web UI 400 can present command suggestions based on matches in the sub-command, option name, and/or option values. For example and in one embodiment, the user could enter a string of text that would match a node identifier. In this example, the user could enter the token "dde6" and the web UI could present the node info and node disk commands for the node-id "00000000-0000-0000-0000-002590a8dde6."

FIG. 5 is an illustration 500 of a web UI 500 with a list of command suggestions given in response a command token entered by a user, where the first suggestion is given as a watermark. In FIG. 5, the web UI 700 includes a command bar 502 that is used to input the command token and a suggestions output window 504. Similar to the web UI 400 in FIG. 4, the web UI 500 displays the command suggestions in the suggestions output window 504 based on the command token entered in the command bar 502. In addition, the web UI 500 displays a watermark 506 that displays one of the command suggestions matching the command token 508. In one embodiment, the watermark 506 is text that is greyed out displaying the remainder of the suggested command that matches in the command token 508. While in one embodiment, the watermark 506 represents the first suggested command in the command suggestions, in alternate embodiments, the watermark 506 can represents a different suggestion command.

As illustrated in the FIG. 5 and in one embodiment, if the user enters the command token "stcli da," the web UI 500 displays "tastore list" in a greyed out watermark to display the suggested command "stcli datastore list" to the user in the command bar 502. In another embodiment, the web UI 500 displays the command suggestions matching the command token 508 "stcli da", such as "stcli datastore list," "stcli datastore info -datastore-id 000000000000000000-00000000000000141," "stcli datastore "stcli datastore info -datastore-id SYSTEM," "stcli datastore info -datastore-id 000000000000000000-00000000000000141 --newname," "stcli datastore "stcli datastore info -datastore-id SYSTEM --newname," "stcli datastore info -datastore-id 000000000000000000-00000000000000195," "stcli datastore info -datastore-name suresh." As in FIG. 4, web UI 500 displays the command suggestions that match the term the inputted command token 508. In one embodiment, autocompletion uses the command illustrated by the watermark. For example and in one embodiment, as illustrated in FIG. 5, use of a 'tab' key or signal will auto-complete the command "stcli datastore list."

Figure 6:
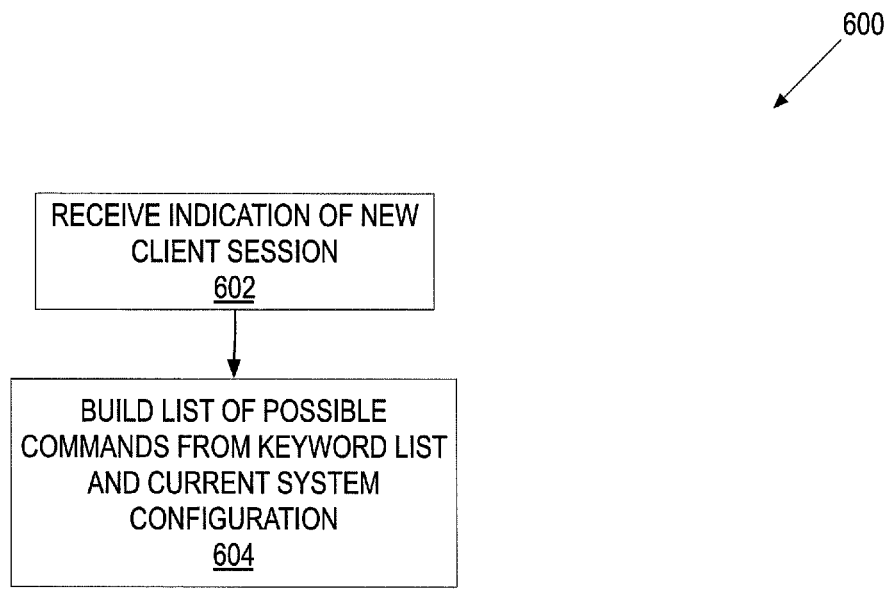
FIG. 6 is a flow diagram of one embodiment of a process to generate a list of complete commands for the command line interface.

As described above, a management server generates a list of possible commands in response to a client session indication using the current configuration of the StorFS system. FIG. 6 is a flow diagram of one embodiment of a process 600 to generate a list of complete commands for the command line interface. In one embodiment, process 600 is performed by a CLI module to generate a list of complete commands, such as the CLI module 310 as described in FIG. 3 above. In FIG. 6, process 600 begins by receiving an indication that a new client session has started at block 602. In one embodiment, the new client session indication can be a user logging into the StorFS system. For example and in one embodiment, the new client session indication can be when the management server 304 receives a request from management client 302 to start a client session to manage the StorFS system. In this example, the request can be a hypertext transfer protocol (HTTP) and HTTP secure (HTTPS) request, and/or another type of request indicating that a user wishes to start a client session with the management of the StorFS system.

At block 604, process 600 builds a list of possible commands from a keyword list and a current system configuration of the StorFS system. In one embodiment, the keyword list is the list of possible StorFS actions along with the different subcommand and options for each action. In this embodiment, the actions, subcommand, and options are components of a command. In a further embodiment, the list of possible command is further built using the current system configuration of the StorFS system. For example and in one embodiment, the identifications and names of the StorFS system nodes can be used to build the list of possible keywords. Alternatively, the names and values of items in the datastore of the StorFS system can be use to build the possible command list. For example and in one embodiment, CLI actions, subcommands, and suboptions that utilize StorFS configuration values can be used to build separate commands for different combinations of (action, subcommand, option, configuration value) tuples. As another example and embodiment, the "--node-id" option for the "node info" action subcommand uses node identifiers to complete the command. If the current configuration of the StorFS system includes three configured nodes with separate identifiers, process 600 would generate three different possible commands. If the nodes had identifiers 25, 26, and 27, process could generate the commands: "stcli node info --node-id 25," "stcli node info --node-id 26," and "stcli node info --node-id 27." Each of these commands can used to match a command token Alternatively, if the datastore has datastore items with IDs 141, 195, 320, and 343, process 600 can generate the data store commands of "stcli datastore info --datastore-id 141," "stcli datastore info --datastore-id 195," "stcli datastore info --datastore-id 320," and "stcli datastore info --datastore-id 343."

In one embodiment, process 600 determines all the possible combinations of actions, subcommands, options, and configuration values and generates a list of all possible commands based on the current configuration of the StorFS system. This list of commands can then be used to suggest commands based on a command token entered by the user. In one embodiment, the list of possible commands is stored on the management server and is used by the CLI module to determine matches for command tokens sent from the management client to the management server. In another embodiment, process 600 sends the list of possible commands to the management client that initiated the client session. In this embodiment, the management client uses the list of possible command to determine matches to the command token entered by the user.

Figure 7:
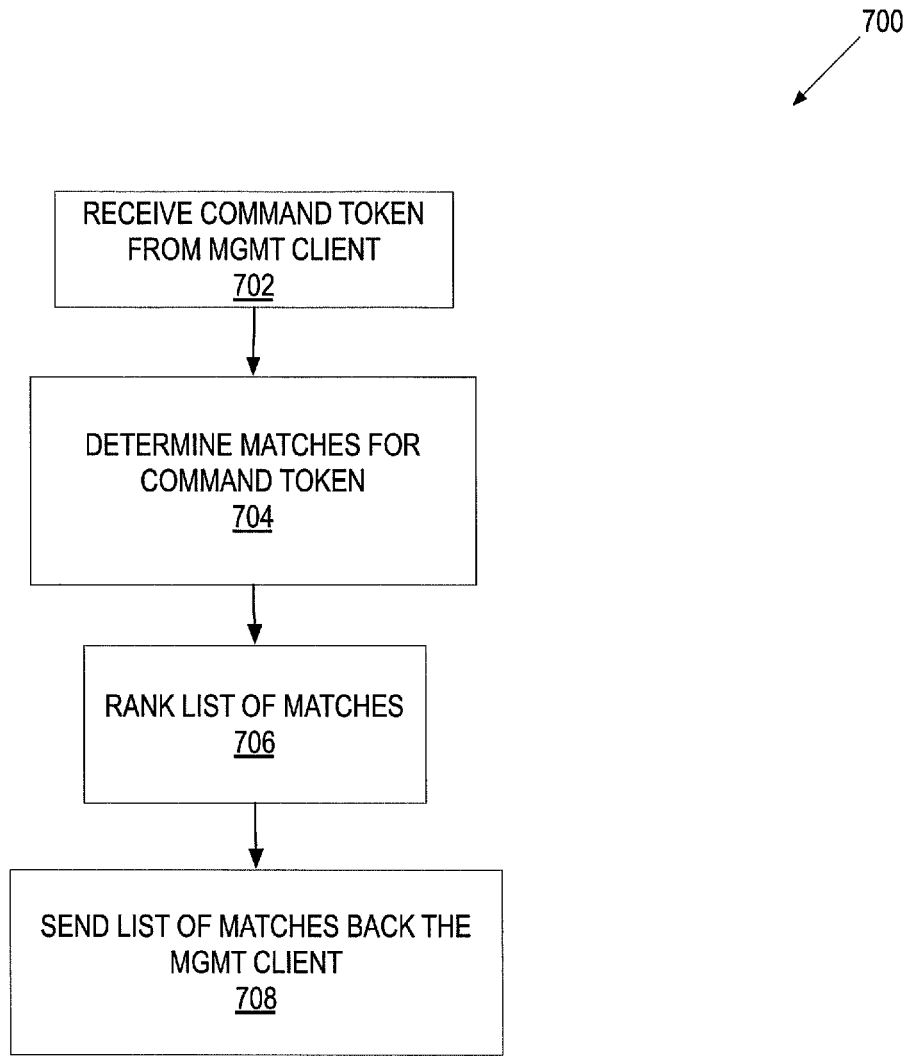
FIG. 7 is a flow diagram of one embodiment of a process to generate a list of command suggestions for the command line interface.

FIG. 7 is a flow diagram of one embodiment of a process 700 to generate a list of command suggestions for the command line interface. In one embodiment, process 700 can be performed by a management server or a management client, depending on which device stores the list of possible commands. In one embodiment, the management server performs process 700 to generate a list of command suggestions based on the list of possible commands that is stored on the management server. In another embodiment, the management client performs process 700 to generate a list of command suggestions based on the list of possible commands that is stored on the management client. In FIG. 7, process 700 begins receiving the command token at block 702. In one embodiment, the command token is a string of one or more characters entered into the web UI by the user, where the command token may match of the commands in the list of possible commands. In one embodiment, the management client captures the command token as the user enters the text into the command bar. In one embodiment, each additional text entered by the user will generate a new command token, which can be used to match for possible command suggestions. For example and in one embodiment, if the user entered the character 'n,' this can match commands with the text "node," "--node-id," or "--newname". If the user enters the character 'o' to give a command token of 'no,' this command token can match commands with the text "node" or "--node-id." If the user enters additional characters to give the command token "node-," this command token can match commands with the text "--node-id." In one embodiment, as the user enters the additional characters, process 700 generate and displays the same or a new list of suggested commands. In this embodiment, the generation and displaying of the suggested commands appears instantaneous.

At block 704, process 700 determines a match for the command token using the list of possible commands. In one embodiment, each of the possible commands is a complete command, where a complete command is a command that trigger an action by the management server (e.g., return a status, update a value, list information, create an object, or delete an object). In one embodiment, process 700 determines a match by searching each of the possible commands for a match. The match can be a text match, where the text of the command token is located in a matching possible command. Alternatively, the text match can be a fuzzy match that can match based on approximate matches and can be used for matches based on close matches, misspellings, typos, or other types of textual transformations. Alternatively, the matching can be based on a wildcards or regular expression matches.

In one embodiment, process 700 determines some or all of the possible matches for the command token with the set of possible commands. In one embodiment, process 700 determines the first N command matches. At block 706, process 700 ranks the possible command matches. In one embodiment, process 700 ranks more commonly used command matches higher and less commonly used matches are ranked lower. For example and in one embodiment, the most commonly used commands by that particular user within the context of a previously run command would be ranked higher. In this example, if the user ran show details of datastore1, the next command could be to update the datastore. Thus process 700 would rank the command datastore1 higher with the next set of matching commands (if applicable).

Process 700 sends the list of possible command matches back to the entity that requested the command matches. In one embodiment, if the management server is performing process 700, process 700 sends the list of possible command matches to the management client. In this embodiment, the list of possible matches is displayed by the management client. In another embodiment, if the management client is performing process 700, process 700 sends the list of possible command matches to the component of the web browser that displays the list of possible commands.

FIG. 8 is an illustration of a web UI 800 displaying an output for an entered command line interface command. In FIG. 8, the web UI 800 includes a command bar 802 and a command output display area 804. In one embodiment, the command bar 802 displays the command that was executed and the command output display area 804 displays the results of the executed command.

Figure 9:
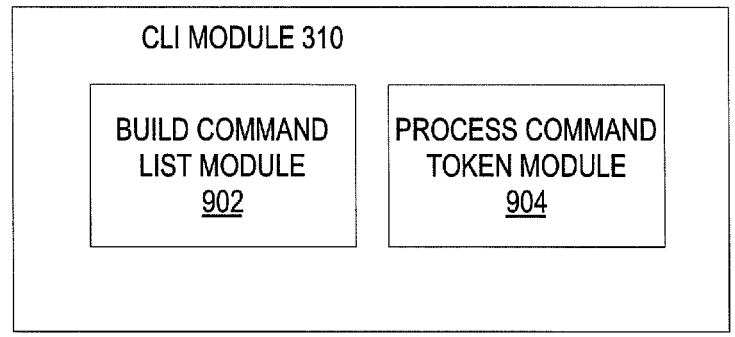
FIG. 9 is a block diagram of a command line interface module that gives a set of command suggestions for a command token.

FIG. 9 is a block diagram of a command line interface module 310 that gives a set of command suggestions for a command token. In one embodiment, the command line interface module 310 includes a build command list module 902 and process command token module 904. In one embodiment, the build command list module 902 builds the command list as described in FIG. 4 above. The process command token module 904 processes the command token to give s list of possible command matches as described in FIG. 5 above.

Figure 10:
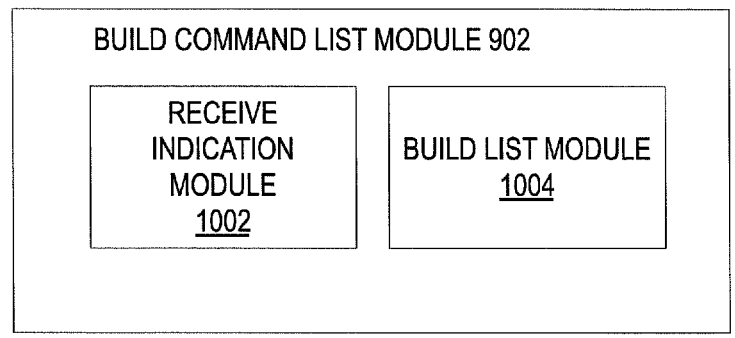
FIG. 10 is a block diagram of a build command list module that builds a list of possible commands.

FIG. 10 is a block diagram of a build command list module 902 that builds a list of possible commands. In one embodiment, the build command list module 902 includes a receive indication module 1002 and build list module 1004. In one embodiment, the receive indication module 1002 receives an indication of a client session starting as described in FIG. 4, block 402. The build list module 1004 builds a list of possible command as described in FIG. 4, block 404.

Figure 11:
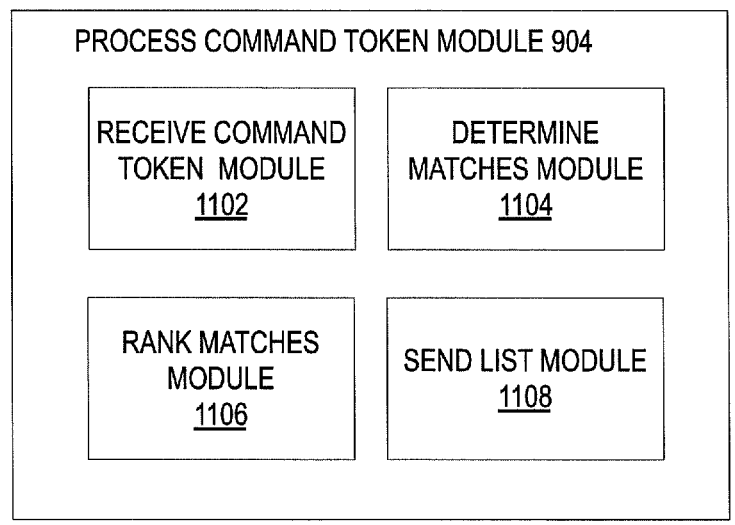
FIG. 11 is a block diagram of a process command token that gives a set of command suggestions for a command token.

FIG. 11 is a block diagram of a process command token module 904 that gives a set of command suggestions for a command token. In one embodiment, the process command token module 904 is part of the command line interface module 310 on the management server 304 as illustrated in FIG. 3 above. In another embodiment, the process command token module 904 is part of the management client 302. In one embodiment, the process command token module 904 can be installed in the management client 302 when the client session is started between the management client 302 and the management server 304. In one embodiment, the process command token module 904 includes a receive command token module 1102, determine matches module 1104, rank matches module 1106, and send list module 1108. In one embodiment, the receive command token module 1102 receives the command token as described in FIG. 5, block 502 above. The determine matches module 1104 determines one or more matches for the command token as described in FIG. 5, block 504 above. The rank matches module 1106 ranks the list of possible matches as described in FIG. 5, block 506 above. The send list module 1108 sends the list of possible matches as described in FIG. 5, block 508 above.

While in one embodiment, the CLI command suggestion is illustrated with reference to a CLI for the StorFS system, in alternate embodiments, the CLI command suggestion can be used for other device CLIs that have a device configuration. In one embodiment, the CLI command suggestion can be used for suggesting CLIs for another type of network device (e.g., router, switch, or another type of network device, whether virtual or physical). For example and in one embodiment, the CLI command suggestion can be used for a switch with multiple interfaces or line cards. In this embodiment, the CLI command suggestions builds a list of possible command using the configuration of the switch, including the current configuration of the interfaces and/or line cards. As another example and embodiment, the CLI command suggestion can be used for a CLI that manages hypervisors for guest virtual servers (e.g., VMware's ESX enterprise software).

Figure 12:
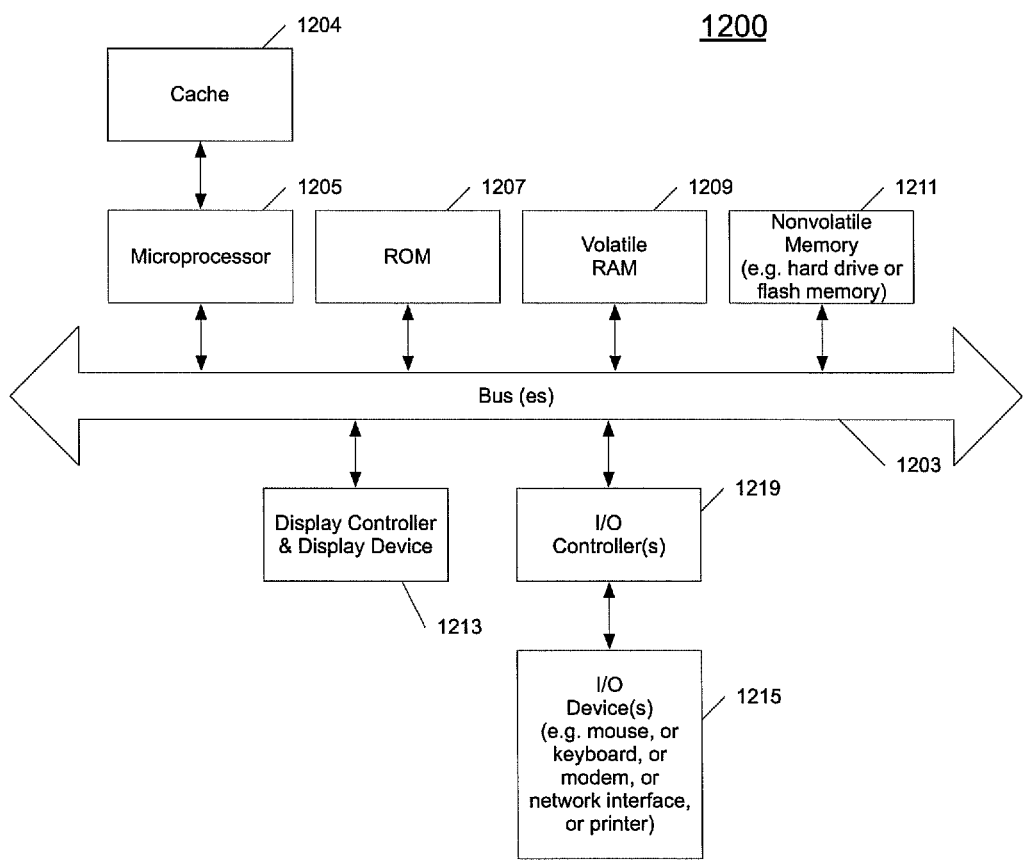
FIG. 12 illustrates one example of a typical computer system, which may be used in conjunction with the embodiments described herein.

FIG. 12 shows one example of a data processing system 1200, which may be used with one embodiment of the present invention. For example, the system 1200 may be implemented including a physical server 102A-C as shown in FIG. 1. Note that while FIG. 12 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

FIG. 12 shows one example of a data processing system 1200, which may be used with one embodiment of the present invention. For example, the system 1200 may be implemented including a management server 304 as shown in FIG. 3. Note that while FIG. 12 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 12, the computer system 1200, which is a form of a data processing system, includes a bus 1203 which is coupled to a microprocessor(s) 1205 and a ROM (Read Only Memory) 1207 and volatile RAM 12012 and a non-volatile memory 1211. The microprocessor 1205 may retrieve the instructions from the memories 1207, 12012, 1212 and execute the instructions to perform operations described above. The bus 1203 interconnects these various components together and also interconnects these components 1205, 1207, 12012, and 1212 to a display controller and display device 1213 and to peripheral devices such as input/output (I/O) devices which may be mice, keyboards, modems, network interfaces, printers and other devices which are well known in the art. Typically, the input/output devices 1215 are coupled to the system through input/output controllers 1217. The volatile RAM (Random Access Memory) 12012 is typically implemented as dynamic RAM (DRAM), which requires power continually in order to refresh or maintain the data in the memory.

The mass storage 1211 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1212 will also be a random access memory although this is not required. While FIG. 12 shows that the mass storage 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1203 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "computing," "ranking," "generating," "communicating," "reading," "writing," "transferring," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to generate suggested command completions for a distributed storage system, the method comprising:
    determining a start of a client session for the management client;
    in response to the determining,
        retrieving the current configuration of the distributed storage system, and
        generating the plurality of complete commands using the current configuration;
    receiving a command token from a management client, wherein the command token is a partial command for the distributed storage system;
    retrieving the plurality of complete commands for the distributed storage system, wherein at least one of the plurality of complete commands includes a command text and a parameter based on a current configuration of the distributed storage system;
    determining a subset of the plurality of complete commands that match the command token; and
    sending the subset of the plurality of complete commands to the management client, wherein the management client displays the subset of the plurality of complete commands.

2. The non-transitory machine-readable medium of claim 1, wherein the parameter is selected from the group consisting of a node identifier and a node Internet Protocol (IP) address, name, object identifiers, and sub-actions.

3. The non-transitory machine-readable medium of claim 1, wherein each of the plurality of complete commands includes a command line interface command.

4. The non-transitory machine-readable medium of claim 1, wherein one of the plurality of complete commands includes a command line interface option, wherein the parameter is an option value for the command line interface option.

5. The non-transitory machine-readable medium of claim 1, further comprising:
    ranking the plurality of complete commands.

6. The non-transitory machine-readable medium of claim 1, wherein the management client is a web browser running on a remote device and the sending of the subset of the plurality of complete commands is sent from a management server to the remote device.

7. The non-transitory machine-readable medium of claim 1, further comprising:
    receiving an indication that one of the subset of the plurality of complete commands is to be executed;
    executing the that one of the subset of the plurality of complete commands; and
    sending the results of the executed command to the management client.

8. The non-transitory machine-readable medium of claim 7, further comprising:
    if the results of the executed command is an error, sending an error message to the management client.

9. The non-transitory machine-readable medium of claim 1, further comprising:
    authenticating a user, wherein the plurality of complete commands is determined based on privileges of the authenticated user.

10. The non-transitory machine-readable medium of claim 1, wherein the plurality of complete commands is a restricted set of complete commands.

11. A method to generate suggested command completions for a distributed storage system, the method comprising:
    determining a start of a client session for the management client;
    in response to the determining,
        retrieving the current configuration of the distributed storage system, and
        generating the plurality of complete commands using the current configuration;
    receiving a command token from a management client, wherein the command token is a partial command for the distributed storage system;
    retrieving the plurality of complete commands for the distributed storage system, wherein at least one of the plurality of complete commands includes a command text and a parameter based on a current configuration of the distributed storage system;
    determining a subset of the plurality of complete commands that match the command token; and
    sending the subset of the plurality of complete commands to the management client, wherein the management client displays the subset of the plurality of complete commands.

12. The method of claim 11, wherein the parameter is selected from the group consisting of a node identifier and a node Internet Protocol (IP) address, name, object identifiers, and sub-actions.

13. The method of claim 11, wherein each of the plurality of complete commands includes a command line interface command.

14. The method of claim 11, wherein one of the plurality of complete commands includes a command line interface option, wherein the parameter is an option value for the command line interface option.

15. The method of claim 11, further comprising:
    ranking the plurality of complete commands.

16. A system that generates suggested command completions for a distributed storage system, the method comprising:
    a processor;
    a memory coupled to the processor though a bus; and
    a process executed from the memory by the processor that causes the processor to receive a command token from a management client, wherein the command token is a partial command for the distributed storage system, determine a start of a client session for the management client, in response to the determining, retrieving the current configuration of the distributed storage system, and generating the plurality of complete commands using the current configuration, retrieve the plurality of complete commands for the distributed storage system, wherein at least one of the plurality of complete commands includes a command text and a parameter based on a current configuration of the distributed storage system, determine a subset of the plurality of complete commands that match the command token, and send the subset of the plurality of complete commands to the management client, wherein the management client displays the subset of the plurality of complete commands.

17. The system of claim 16, wherein the parameter is selected from the group consisting of a node identifier and a node Internet Protocol (IP) address, name, object identifiers, and sub-actions.

* * * * *